United States Patent [19]

Murata

[11] Patent Number: 5,036,963
[45] Date of Patent: Aug. 6, 1991

[54] VISCOUS CLUTCH ASSEMBLY FOR TORQUE TRANSMISSION IN MOTOR VEHICLE

[75] Inventor: Kiyohito Murata, Susono, Japan

[73] Assignee: Toyota Jidosha Kabushiki Kaisha, Toyota, Japan

[21] Appl. No.: 505,478

[22] Filed: Apr. 6, 1990

[30] Foreign Application Priority Data

Apr. 7, 1989 [JP] Japan .................. 1-89383

[51] Int. Cl.[5] .......................................... F16D 43/284
[52] U.S. Cl. ......................................... 192/35; 192/52
[58] Field of Search ................ 192/35, 54, 57, 70.23

[56] References Cited

U.S. PATENT DOCUMENTS

| | | |
|---|---|---|
| 1,974,390 | 9/1934 | Eason ................................. 192/35 |
| 2,861,225 | 11/1958 | Mergen ............................... 192/35 |
| 3,437,186 | 4/1969 | Roper .................................. 192/35 |
| 3,481,436 | 12/1969 | Wilkowski .......................... 192/35 |
| 3,490,312 | 1/1970 | Seitz et al. .......................... 192/35 |
| 4,058,027 | 11/1977 | Webb .................................. 192/35 |
| 4,266,445 | 5/1981 | Goscenski, Jr. ................... 192/35 |
| 4,683,998 | 8/1987 | Cigdem et al. .................... 192/54 |
| 4,690,258 | 9/1987 | Teraoka et al. ................. 192/93 A |
| 4,842,111 | 6/1989 | Lanzer et al. ..................... 192/35 |

FOREIGN PATENT DOCUMENTS

| | | |
|---|---|---|
| 0203570 | of 0000 | European Pat. Off. . |
| 0314420 | of 0000 | European Pat. Off. . |
| 3426460 | of 0000 | Fed. Rep. of Germany . |
| 61-102330 | 5/1986 | Japan . |
| 61-191432 | 8/1986 | Japan . |
| 61-191434 | 8/1986 | Japan . |
| 1333878 | of 0000 | United Kingdom . |

Primary Examiner—Allan D. Herrmann
Assistant Examiner—Nicholas Whitelaw
Attorney, Agent, or Firm—Oblon, Spivak, McClelland, Maier & Neustadt

[57] ABSTRACT

A viscous clutch assembly adapted for installation in a torque transmission system for effecting a drive connection between a pair of rotary members coaxially arranged for relative rotation. The viscous clutch assembly includes a viscous coupling arranged for generating a viscous resistance force in response to relative rotation between the rotary members, a first cam mechanism cooperable with the viscous coupling for converting the viscous resistance force into a thrust force, a friction disc clutch arranged to be brought into engagement when applied the thrust force from the first cam mechanism for establishing the drive connection between the rotary members, and a second cam mechanism cooperable with the viscous coupling for increasing and decreasing the viscous resistance force in response to a difference in torque between the rotary members.

7 Claims, 5 Drawing Sheets

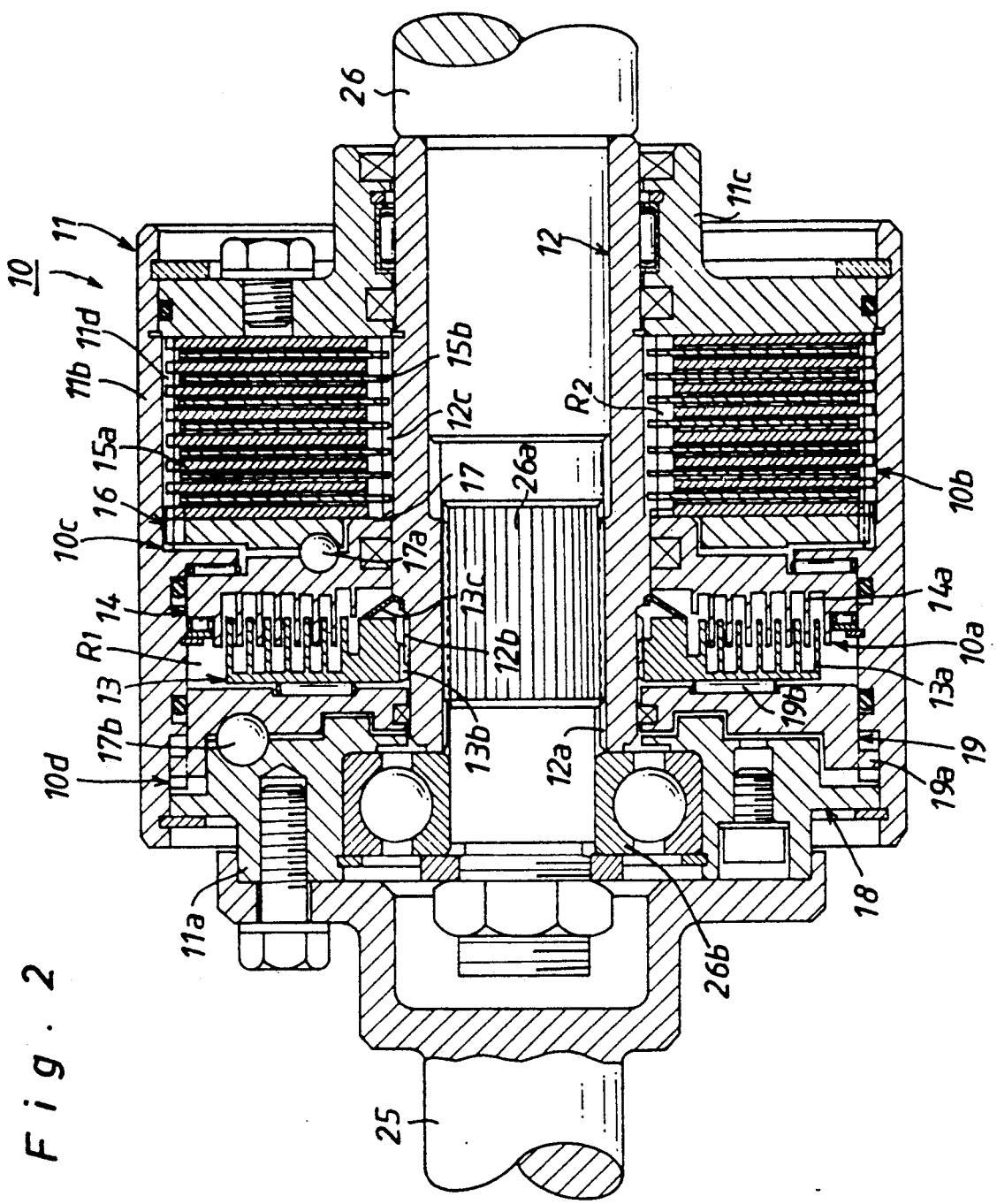

Fig. 4(a)
Fig. 4(b)
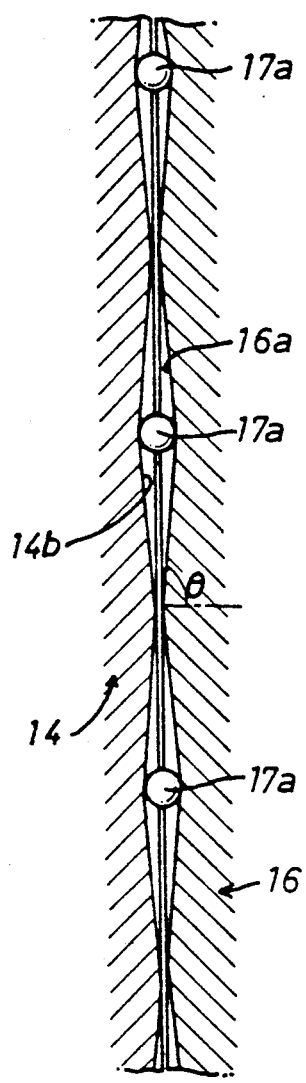
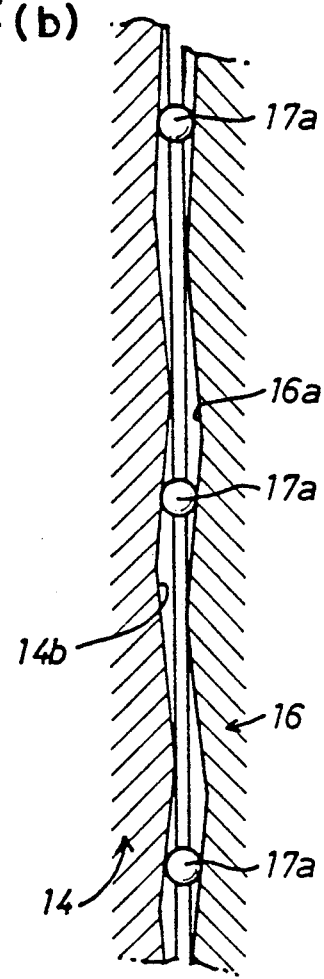
Fig. 4(c)
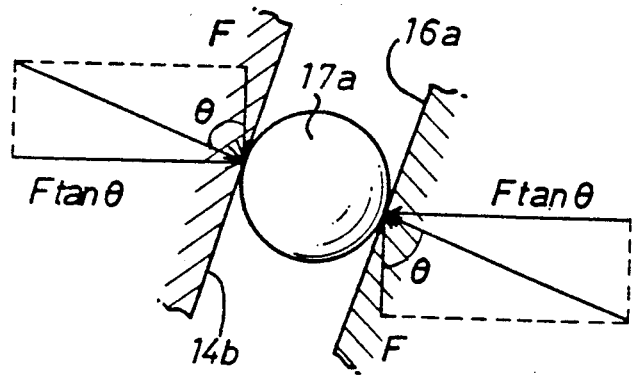

VISCOUS CLUTCH ASSEMBLY FOR TORQUE TRANSMISSION IN MOTOR VEHICLE

BACKGROUND OF THE INVENTION

1. Field of the Invention

The present invention relates to a viscous clutch or coupling assembly adapted for installation in torque transmission systems in a motor vehicle for effecting a drive connection between a pair of rotary members coaxially arranged for relative rotation.

2. Discussion of the Prior Art

Conventional viscous coupling assemblies of this kind are, in general, classified into two types. A viscous coupling assembly of the first type is adapted to automatically effect torque transmission between drive and driven rotary members in response to relative rotation thereof. A viscous coupling assembly of the second type is adapted as a limited-slip differential to restrict relative rotation between drive and driven rotary members, between a pair of drive rotary members or between a pair of driven rotary members. The coupling assembly of the first type is mainly installed in one of torque transmission systems in a four-wheel drive vehicle of the real-time type. The coupling assembly of the second type is mainly installed in a differential unit.

In the other point of view, conventional viscous coupling assemblies of this kind may also be classified into two other types. Viscous coupling assemblies of the first type are disclosed, for example, in Japanese Patent Laid-Open Publication Nos. 61-102330 and 61-191434, wherein transmitted torque is determined to be in response to a difference in rotation between drive and driven rotary members, hereinafter simply called "relative-rotation responsive type". A viscous coupling assembly of the second type is disclosed, for example, in Japanese Patent Laid-Open Publication No. 61-191432, wherein transmitted torque is determined to be in response to a difference in torque between drive and driven rotary members, hereinafter simply called "torque responsive type".

Transmitted torque T in the relative-rotation type is represented by the following equation.

$$T = K \times N^\alpha$$

where K and α are coefficients, respectively, and N is a difference in rotation between drive and driven rotary members. On the other hand, transmitted torque T in the torque responsive type is represented by the following equation:

$$T = I \times \omega$$

where I is the moment of inertia of the driven rotary member, and ω is the angular acceleration of the driven rotary member. Between the two equations described above, there exists a relationship as represented by the following equation:

$$N = \int_0^t \omega \, dt$$

As is understood from the above-described equations, the torque responsive type is capable of instantaneously responding to a torque change in the rotary members caused by an instantaneous change in torque generated by a prime mover of the vehicle or in grip performance of tire during running, while the relative-rotation responsive type is more slowly responsive to a torque change in the rotary members than the torque responsive type because N is first determined after integration of the angular acceleration ω by time.

In the case that the viscous coupling assemblies of the two types as described above have been installed in one of torque transmission systems in a four-wheel drive vehicle of the real-time type, characteristics of the two responsive types are compared with each other as follows:

(1) Phenomenon of tight corner braking

Since the radius Rf of a turning circle for the front road wheels in cornering is larger than that Rr for the rear road wheels, the number of rotation per unit time Nf for the front road wheels becomes larger than that Nr for the rear road wheels to cause a difference N=(Nf−Nr) in rotation therebetween. In this connection, the relative-rotation responsive type has disadvantages such as an increase in steering effort and an increase in the radius of the turning circle due to torque transmission to the respective front and rear road wheels. For this reason, in a motor vehicle provided with the relative-rotation responsive type, the characteristic of torque transmission is determined to be in a range where phenomenon of tight corner braking does not make a driver feel uncomfortable. On the contrary, in a motor vehicle provided with the torque responsive type, any angular acceleration (ω) does not occur unless torque generated by the prime mover is suddenly increased. Thus, no phenomenon of tight corner braking takes place during cornering.

(2) Running performance

With its slower response to a torque change in the rotary members, the relative-rotation responsive type is inferior to the torque responsive type, for example in getting out of slippery roads.

(3) Running feel

With the relative-rotation responsive type, rough acceleration work, for example, causes no any sudden change in torque transmission between front and rear drive wheels to keep running of a motor vehicle stable. With the torque responsive type, however, rough acceleration work causes a sudden change in torque transmitted to one pair of front and rear road wheels to make running of the vehicle unstable, resulting in deterioration of running feel of the driver.

(4) Recognition of slip during running

With the relative-rotation responsive type, slip of the drive wheels is easily recognized by the driver during running of the vehicle, if any. With the torque responsive type, however, slip of the drive wheels causes transmitted torque to immediately distribute to front and rear drive wheels to always maintain the motor vehicle at the upper limit of running performance thereof, so that the drive does not recognize the slip.

SUMMARY OF THE INVENTION

It is, therefore, an object of the present invention to provide an improved viscous clutch assembly capable of providing both the features of good running feel obtainable by the relative-rotation responsive type and of good running performance by the torque responsive type.

According to the present invention, the object is attained by providing a viscous coupling assembly adapted for installation in a torque transmission system for effecting a drive connection between a pair of rotary members coaxially arranged for relative rotation, which comprises first means for generating a viscous resistance force in response to relative rotation of the rotary members, second means cooperable with the first means and being provided for converting the viscous resistance force into a thrust force, third means comprising of a clutch mechanism cooperable with the second means and engageable in response to the thrust force from the second means for establishing the drive connection between the rotary members, and fourth means cooperable with the first means for increasing and decreasing the generated viscous resistance force in the first means in accordance with a difference in torque between the rotary members, and independent of a speed differential between said rotary members.

In a preferred embodiment of the present invention, the first means is in the form of a viscous coupling including a rotary plate arranged for rotation with one of the rotary members and a first cam member rotatably mounted on the one of said rotary members for relative rotation with the rotary plate, the rotary plate being formed at one side thereof with a first set of concentrically spaced annular ribs which are coupled with a second set of concentrically spaced annular ribs formed on one side of the first cam member through a predetermined quantity of viscous fluid stored between the rotary plate and the first cam member, the second means is in the form of a first cam mechanism including a second cam member arranged for rotation with the other rotary member and cooperable with the first cam member for generating a thrust force in accordance with a viscous resistance force acting on the first cam member during relative rotation between the rotary plate and the first cam member, the third means is in the form of a multiple friction disc clutch including a first set of clutch discs arranged for rotation with the one of the rotary members and a second set of clutch discs arranged for rotation with the other rotary member and interleaved with the first set of clutch discs to be brought into frictional engagement with the latter when applied with the thrust force from the second cam member of the first cam mechanism, and the fourth means is in the form of a second cam mechanism including a pair of cam members arranged to rotated relatively to one another during rotation of the other rotary member and cooperable with each other for generating an additional thrust force in response to a difference in torque between the rotary members and applying it to the rotary plate of the viscous coupling.

BRIEF DESCRIPTION OF THE DRAWINGS

Other objects, features and advantages of the present invention will be readily appreciated from the following detailed description of preferred embodiments thereof when considered with the reference to the accompanying drawings, in which:

FIG. 2 is a sectional view of the viscous clutch assembly shown in FIG. 1;

FIG. 3 is a partly enlarged sectional view of a second cam mechanism shown in FIG. 2;

FIGS. 4(a), 4(b) and 4(c) each are an enlarged sectional view illustrating the mode of operation of a first cam mechanism in the viscous clutch assembly shown in FIG. 2;

DESCRIPTION OF THE PREFERRED EMBODIMENTS

Figure 1:
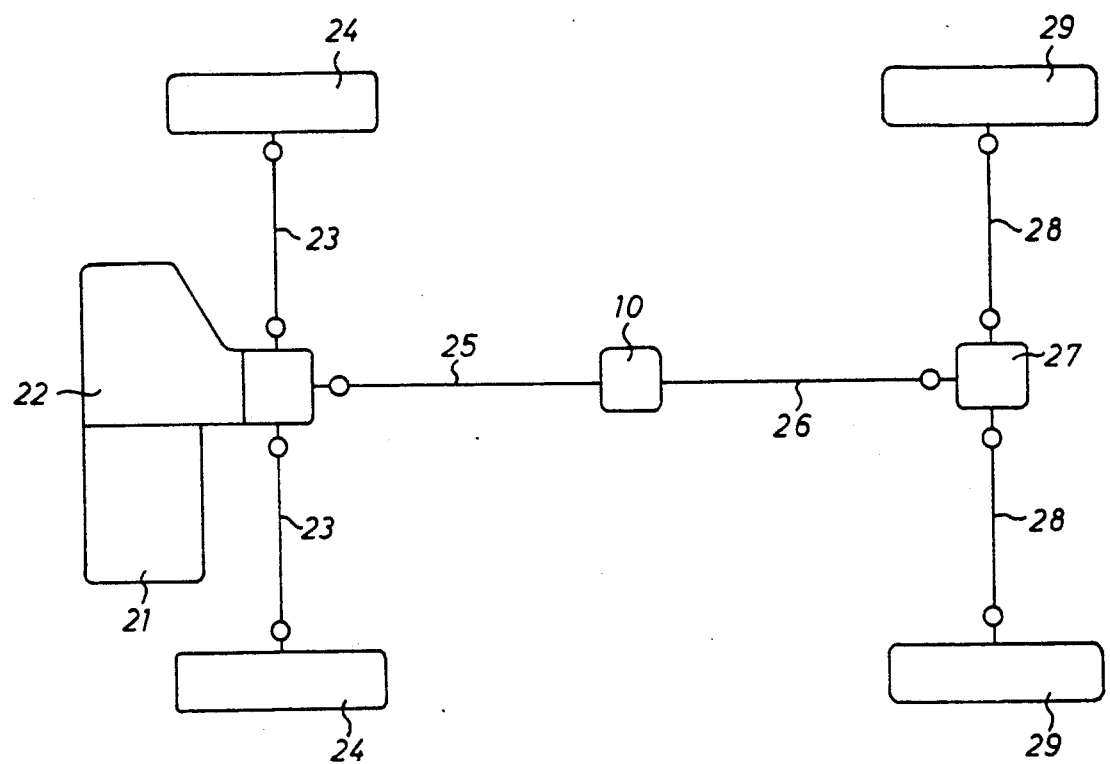
FIG. 1 is a schematic plan view of the arrangement of a four-wheel drive vehicle system incorporating a viscous clutch assembly of the present invention.

FIG. 1 of the drawings diagrammatically discloses a layout of a four-wheel drive vehicle of the real-time type the rear wheel drive system of which includes a viscous clutch assembly 10 of the present invention. The vehicle has a transversely mounted front engine 21 and a transaxle transmission unit 22 secured to one side of engine 21. The transaxle transmission unit 22 includes a power transmission having an input shaft (not shown) drivingly connected an output shaft of engine 21 through a clutch mechanism (not shown) and a power transfer device arranged to transfer the power from the power transmission to a pair of front axle shafts 23 and to a first longitudinal front-to-rear propeller shaft 25. The front axle shafts 23 are connected at their outer ends to a pair of front drive wheels 24, while the propeller shaft 25 is drivingly connected to a second longitudinal front-to-rear propeller shaft 26 by means of the viscous clutch assembly 10. The second propeller shaft 26 is connected by universal joint means to a rear differential indicated at 27. The rear differential 27 is drivingly connected to a pair of split rear axle shafts 28 to provide conventional differential action between a pair of rear drive wheels 29.

As shown in FIG. 2, the viscous clutch assembly 10 includes a three-part outer cylindrical casing 11 arranged in surrounding relationship with an inner sleeve member 12 to contain therein a viscous coupling 10a for generating a viscous resistance force, a friction clutch mechanism 10b for effecting a drive connection between the propeller shafts 25, 26, a first cam mechanism 10c cooperable with the viscous coupling for generating a thrust force, and a second cam mechanism 10d cooperable with the viscous coupling for generating an additional thrust force acting on the viscous coupling 10a. The outer cylindrical casing 11 has a cup-shaped portion 11a, a cylindrical drum portion 11b rotatably coupled with the cup-shaped portion 11a, and an end wall portion 11c rotatably coupled within the right-hand end of drum portion 11b in a liquid-tight manner. The inner sleeve member 12 is rotatably mounted within the cylindrical casing 11 in a liquid-tight manner to form a sealed annular chamber in casing 11. The inner sleeve member 12 has an internally splined portion 12a coupled over an externally splined portion 26a of second propeller shaft 26 for rotation therewith. The cup-shaped portion 11a of casing 11 is rotatably supported on the forward end of second propeller shaft 26 through a ball bearing 26b and joined to the rearward end of first propeller shaft 25 by means of a plurality of bolts.

The viscous coupling 10a includes a rotary plate 13 axially slidably mounted on the inner sleeve member 12 for rotation therewith and a first cam member 14 rotatably mounted on the inner sleeve member 12 through an annular seal. The rotary plate 13 is formed at its right side with a first set of concentrically spaced annular ribs 13a and at its inner periphery with an internally splined portion 13b which is coupled over an externally splined portion 12b of inner sleeve member 12. The first cam member 14 is formed at its left side with a second set of concentically spaced annular ribs 14a which are coupled with the first set of annular ribs 13a. The first cam member 14 is rotatably coupled within the cylindrical drum portion 11b of casing 11 through an annular seal and retained in place in an axial direction by means of a pair of axially spaced needle bearings. A viscous fluid chamber $R_1$ is formed on the left side of first cam member 14 and filled with a predetermined quantity of viscous fluid such as a silicone fluid.

The friction clutch mechanism 10b is in the form of a multiple disc clutch mechanism of the wet type which includes a first set of clutch discs 15a arranged for rotation with the cylindrical drum portion 11b of casing 11 and a second set of clutch discs 15b arranged for rotation with the inner sleeve member 12. The first set of clutch discs 15a are formed at their outer peripheries with splines which are drivingly engaged with internal splines 11d formed on the inner surface of cylindrical drum portion 11b of casing 11. The second set of clutch discs 15b are formed at their inner peripheries with splines which are drivingly engaged with external splines 12c formed on the inner sleeve member 12. The clutch discs 15a are interleaved with the clutch discs 15b to be brought into engagement with the latter. A chamber $R_2$ formed between the drum portion 11b of casing 11 and the inner sleeve member 12 is filled with a predetermined quantity of clutch fluid.

The first cam mechanism 10c includes a second cam member 16 cooperable with the first cam member 14 and a plurality of circumferentially spaced balls 17a. The second cam member 16 is in the form of an annular thrust plate having external splines which are drivingly engaged with the internal splines 11d of drum portion 11b of casing 11. The second cam member 16 is axially slidably arranged adjacent the leftmost clutch disc 15a and is rotatable with the drum portion 11b of casing 11. The second cam member 16 is rotatably coupled at its inner periphery with an annular boss of first cam member 14. As shown in FIG. 4(a), the second cam member 16a is formed at its left side with an annular cam groove 16a which faces a corresponding annular cam groove 14b formed on the right side of first cam member 14. The annular cam grooves 14b and 16a each have a plurality of crests and roots with a cam pressure angle $\theta$. The balls 17a are each disposed in a space between the opposed roots of cam grooves 14b and 16a.

The second cam mechanism 10d includes a pair of cam members 18, 19 and a plurality of circumferentially spaced balls 17b. The left-hand cam member 18 is integrally formed with the cup-shaped portion 11a of casing and is jointed to the rearward end of first propeller shaft 25 as described above. The right-hand cam member 19 is in the form of an annular thrust plate disposed between the rotary plate 13 and cam member 18. The right-hand cam member 19 is axially slidably engaged at its externally splined portion 19a with an internally splined portion of cylindrical drum portion 11b of casing 11 and is rotatably mounted at its inner periphery on the inner sleeve member 12 in a liquid-tight manner. Disposed between the cam member 19 and rotary plate 13 is a needle thrust bearing 19b which receives the rotary plate 13 loaded by a dish spring 13c. The balls 17b are each disposed in a space between the opposed roots of cam grooves formed respectively on the cam members 18 and 19 in the same manner as those in the first cam mechanism 10c.

The quantity of viscous fluid filled in the viscous fluid chamber $R_1$ should be determined to allow axial displacement of the rotary plate 13 toward the first cam member 14. As shown in FIG. 3, the annular ribs 13a of rotary plate 13 and the annular ribs 14a of first cam member 14 each have an overlapped portion in an axial length $l_1$. In this embodiment, the quantity of viscous fluid filled in the viscous fluid chamber $R_1$ is determined in such a manner that the axial displacement of rotary plate 13 toward the first cam member 14 is allowed in a distance corresponding to the shorter one of axial length $l_2$ and $l_3$.

In operation, the outer cylindrical casing 11 and cam members 14, 16, 18, 19 rotate with the first propeller shaft 25, while the inner sleeve member 12 and rotary plate 13 rotate with the second propeller shaft 26. When the first propeller shaft 25 rotates at a different speed than the second propeller shaft 26, relative rotation between the rotary plate 13 and first cam member 14 will occur to generate a viscous frictional torque $T_1$ as represented by the following equation.

$$T_1 = K \cdot \frac{\mu \cdot (\beta_1) \cdot N \cdot l_1}{h} \cdot \sum_{i=1}^{n} (ri)^3$$

where K is constant, $\mu$ is the fluid viscosity, $\beta_1$ is a filling ratio of the viscous fluid in fluid chamber $R_1$, $N_1$ is the difference in rotation between propeller shafts 25 and 26, $l_1$ is the axial length of the overlapped portions of opposed ribs 13a, 14a, h is the space between opposed ribs 13a, 14a, and ri is each radius of portions at which the viscous shearing force is generated.

The viscous frictional torque $T_1$ acts as a resistance force on the first cam member 14 to restrict relative rotation between the rotary plate 13 and cam member 14. As shown in FIG. 4 (c), a resistance force F at balls 17a is converted into a thrust force $S = F \tan \theta$ by means of the first cam mechanism 10c. When applied with the thrust force S, the second cam member 16 is moved as shown in FIG. 4(b) to bring the clutch disc 15a into frictional engagement with the clutch discs 15b. As a result, a drive connection between the outer cylindrical casing 11 and inner sleeve member 12 is established to transfer the drive power from the first propeller shaft 25 to the second propeller shaft 26 thereby to effect the four-wheel drive mode of the vehicle. In this instance, the frictional engagement force between the clutch discs 15a and 15b will increase or decrease proportionally to the difference in rotation between the rotary plate 13 and cam member 14.

On examination of the process of change in the difference in rotation between propeller shafts 25 and 26 from $N_1$ to $N_2$ with an angular acceleration $\omega$ caused by change in road surface conditions, acceleration work and the like, a torque $T_{o1}$ acting on the first propeller shaft 25 at the initial stage is represented by the following equation.

$$To_1 = To + I\omega$$

where I is the moment of inertia of the driving parts in the viscous clutch assembly 10, that is, excluding component parts such as the propeller shafts 25, 26, inner sleeve member 12, rotary plate 13 and clutch discs 15b. The change $I\omega$ in the torque causes the difference in phase angle between cam members 18, 19 and balls 17b in response to the torque difference to become larger than that shown in FIG. 4 (b) so that the cam member 19 axially urges the rotary plate 13 to compress air in the viscous fluid chamber R₁, resulting in an increase of Δl in the axial length l₁ of the overlapped portions of annular ribs 13a and 14a to an axial length of (l₁+Δl). In this instance, a viscous frictional torque T₂ generated in the viscous coupling 10a is represented by the following equation.

$$T_2 = K \cdot \frac{\mu \cdot (\beta_2) \cdot (N + \omega t) \cdot (l_1 + \Delta l)}{h} \cdot \sum_{i=1}^{n} (ri)^3$$

A ratio α of T₂ T₁, that is, a ratio between respective transmitted torques from propeller shaft 25 to propeller shaft 26 with and without the second cam mechanism 10d, is represented by the following equation.

$$\alpha = \frac{T_2}{T_1} = \frac{\mu \cdot (\beta_2) \cdot (N + \omega t) \cdot (l_1 + \Delta l)}{\mu \cdot (\beta_1) \cdot N \cdot l_1}$$

This means that the second cam mechanism 10d acts to increase the transmitted torque by α times at a moment of occurrence of a difference in rotation, but independent of the value of this difference in rotation. In other words, the transmitted torque instantly increases in proportion to the increase Δl of the overlapped axial length of annular ribs 13a and 14a and the increase $(\beta_2 - \beta_1)$ of the filling ratio of the viscous fluid in chamber R₁.

Figure 5A:
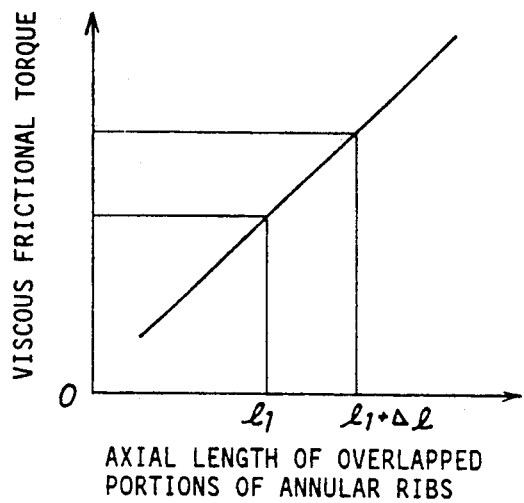
FIG. 5(a) is a graph showing a relationship between an axial length of overlapped portions of annular ribs shown in FIG. 3 and viscous frictional torque.
Figure 5B:
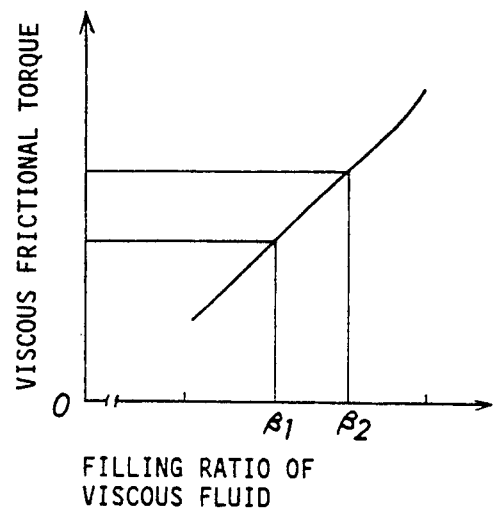
FIG. 5(b) is a graph showing a relationship between a filling ratio of viscous fluid and the viscous frictional torque.
Figure 5C:
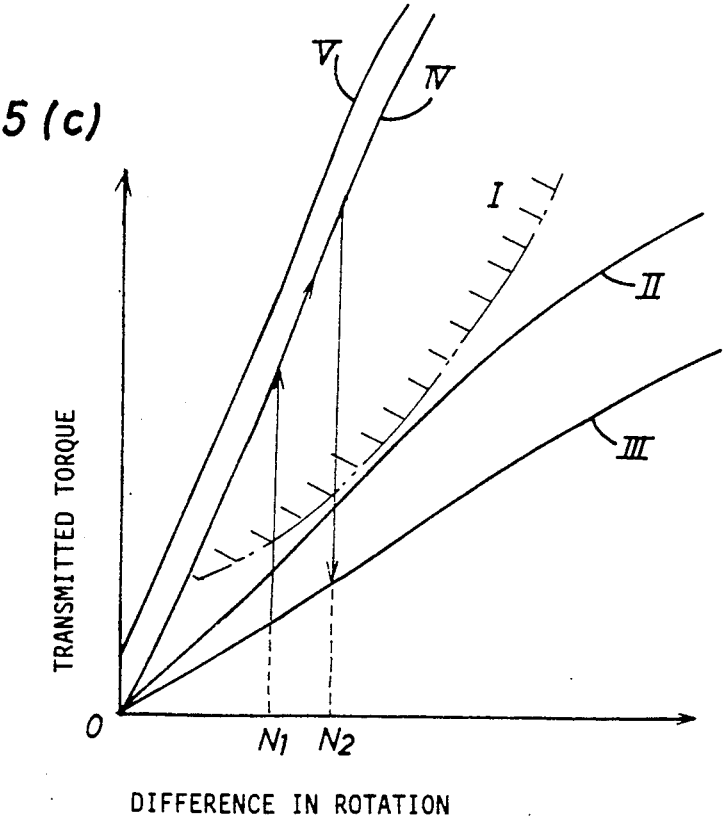
FIG. 5(c) is a graph showing a relationship between a difference in rotation and transmitted torque.

In FIG. 5 (a) and FIG. 5 (b), there are illustrated a relationship between the axial length of overlapped portions of the ribs 13a, 14a and viscous frictional torque, and a relationship between the filling ratio of viscous fluid and the viscous frictional torque, respectively. In FIG. 5 (c) there is illustrated a relationship between the difference in rotation and the transmitted torque, wherein the character I represent a region where phenomenon of tight corner braking occurs (to be felt uncomfortable to the driver). It is considered to be best that the relationship between the difference in rotation and the transmitted torque is determined to be as close to the region I as possible for better running performance of the vehicle. In conventional viscous clutch assemblies of the relative-rotation responsive type, however, the relationship between the difference in rotation and the transmitted torque is actually determined to be on a curve II. As for the viscous clutch assemblies 10 of the present invention, the relationship is determined to be on a curve III far apart from the region I. When acceleration of the propeller shaft 25 has changed, the relationship moves from the curve III to a curve IV, resulting in an increase of the transmitted torque α times as large as on the curve III.

Consequently, the viscous clutch assembly 10 of the present invention is basically of the relative-rotation responsive type wherein transmitted torque increases in proportion to the difference in rotation, while on change of acceleration, the viscous clutch assembly 10 changes into the torque responsive type to develop high running performance. The change into the torque responsive type and back into the relative-rotation responsive type is smoothly carried out under the occurrence of relative rotation without causing unwanted noises. Furthermore, the relationship between the difference in rotation and the transmitted torque can be determined to be far apart from the region I to ensure a better running feel.

Figure 6:
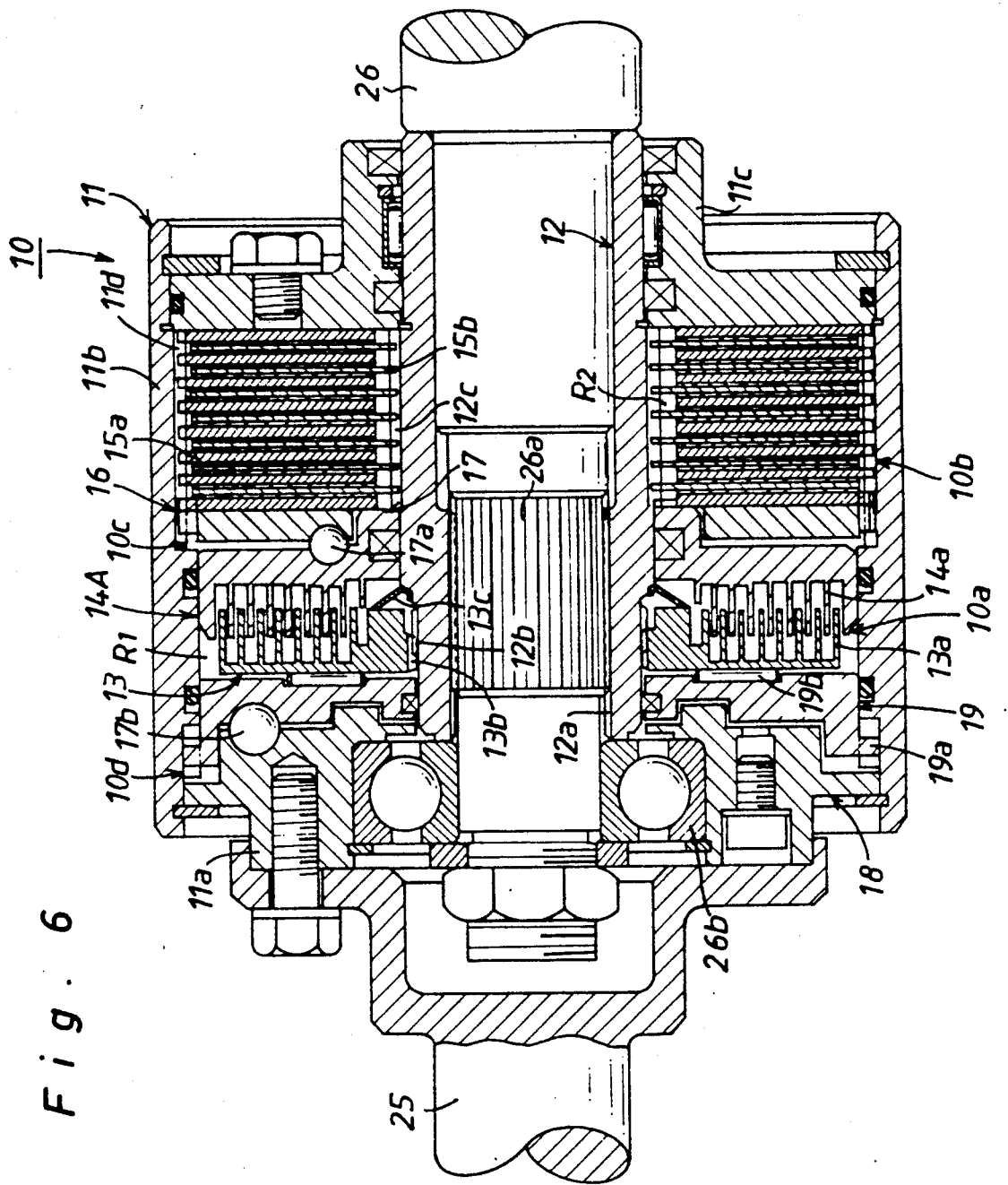
FIG. 6 is a sectional view of a modification of the viscous clutch assembly shown in FIG. 2.

In FIG. 6 there is illustrated a modification of the viscous fluid clutch assembly 10 described above, wherein a first cam member 14A is axially slidably coupled within the cylindrical drum portion 11b of casing 11. With such an arrangement, the occurrence of angular acceleration causes the cam member 19 to axially move thereby to increase the pressure in chamber R₁ of the viscous coupling 10a. Thus, the first cam member 14A axially moves to bring the clutch discs 15a into frictional engagement with the clutch discs 15b in the clutch mechanism 10b. As a result, the frictional engagement force added by movement of the first cam member 14A causes the relationship between the difference in rotation and the transmitted torque to change from the curve IV to the curve V.

Having now fully set forth both structure and operation of preferred embodiment of the concept underlying the present invention, various other embodiments as, well as certain variations and modifications of the embodiments shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. A viscous clutch assembly adapted for installation in a torque transmission system for effecting a drive connection between a pair of rotary members coaxially arranged for relative rotation, said viscous clutch assembly comprising first means for generating a viscous resistance force in response to relative rotation between said rotary members, second means cooperable with said first means and being provided for converting the viscous resistance force into a thrust force, third means comprising a clutch mechanism cooperable with said second means and engageable in response to the thrust force from said second means for establishing the drive connection between said rotary members, and fourth means cooperable with said first means for increasing and decreasing the generated viscous resistance force in said first means in accordance with a difference in torque between said rotary members, and independent of a value of a speed differential between said rotary members.

2. A viscous clutch assembly as claimed in claim 1, wherein said first means comprises a viscous coupling including a rotary plate arranged for rotation with a first of said pair of rotary members and a first cam member rotatably mounted on the first of said pair of rotary members for relative rotation with said rotary plate, said rotary plate being formed at one side thereof with a first set of concentrically spaced annular ribs which are coupled with a second set of concentrically spaced annular ribs formed on one side of said first cam member through a predetermined quantity of viscous fluid stored between said rotary plate and said first cam member, wherein said second means comprises a first cam mechanism including a second cam member arranged for rotation with a second of said pair of rotary members and cooperable with said first cam member for generating a thrust force in accordance with a viscous resistance force acting on said first cam member during relative rotation between said rotary plate and said first cam member, wherein said third means comprises a multiple friction clutch mechanism including a first set of clutch discs arranged for rotation with the first said rotary members and a second set of clutch discs arranged for rotation with the second rotary member and interleaved with said first set of clutch discs to be brought into frictional engagement therewith when applied with the thrust force from said second cam member of said cam mechanism, and wherein said fourth means comprises a second cam mechanism including a pair of cam members arranged to be rotated relatively to one another during rotation of the second rotary member and cooperable with each other for generating an additional thrust force in response to a difference in torque between said rotary members and applying said additional thrust force to said rotary plate of said viscous coupling.

3. A viscous clutch assembly as claimed in claim 1, further comprising an inner sleeve member mounted on a first of said rotary members for rotation therewith and a cylindrical casing coupled with a second rotary member in surrounding relationship with said inner sleeve member, wherein said first, second, third and fourth means are housed coaxially in an annular space between said inner sleeve member and said cylindrical casing.

4. A viscous clutch assembly as claimed in claim 3, wherein said first means comprises a viscous coupling including a rotary plate axially slidably mounted on said inner sleeve member for rotation therewith and a first cam member rotatably coupled within said cylindrical casing and being fixed in place in an axial direction, said rotary plate being formed at one side thereof with a first set of concentrically spaced annular ribs which are coupled with a second set of concentrically spaced annular ribs formed on one side of said first cam member through a predetermined quantity of viscous fluid stored between said rotary plate and said first cam member.

5. A viscous clutch assembly as claimed in claim 4, wherein said second means a cam mechanism including a second cam member axially slidably coupled within said cylindrical casing for rotation therewith and cooperable with said first cam member for generating a thrust force in response to a viscous resistance force acting on said first cam member during relative rotation between said rotary plate and said first cam member, and wherein said third means comprises a multiple friction disc clutch mechanism including a first set of clutch discs axially slidably coupled within said cylindrical casing for rotation therewith and a second set of clutch discs axially slidably mounted on said inner sleeve member for rotation therewith and interleaved with said first set of clutch discs to be brought into frictional engagement therewith when applied with the thrust force from said second cam member of said cam mechanism.

6. A viscous clutch assembly as claimed in claim 4, wherein said fourth means comprises a cam mechanism including a pair of cam members arranged within said cylindrical casing coaxially with said rotary plate to be rotated relatively to one another during rotation of the second rotary member and cooperable with each other for generating an additional thrust force in response to a difference in torque between said rotary members and applying the additional thrust force to said rotary plate of said viscous coupling.

7. A viscous clutch assembly as claimed in claim 3, wherein said first means comprises a viscous coupling including a rotary plate axially slidably mounted on said inner sleeve member for rotation therewith and a first cam member rotatably and axially slidably coupled within said cylindrical casing, said rotary plate being formed at one side thereof with a first set of concentrically spaced annular ribs which are coupled with a second set of concentrically spaced annular ribs formed on one side of said first cam member through a predetermined quantity of viscous fluid stored between said rotary plate and said first cam member.

* * * * *